United States Patent Office 2,929,800
Patented Mar. 22, 1960

2,929,800

POLYTETRAMETHYLENE ETHER POLY-URETHANE POLYMERS

Frederick B. Hill, Jr., New Castle, Del., assignor to E. I. du Pont de Nemours and Company, Wilmington, Del., a corporation of Delaware No Drawing. Application June 30, 1953
Serial No. 365,270

22 Claims. (Cl. 260—77.5)

This invention relates to new and valuable elastomeric products derived from high molecular weight polyalkylene ether glycols. More particularly, it relates to elastomeric products formed by reactions involving polyalkylene ether glycols and organic diisocyanates.

While according to the prior art it is known to react diisocyanates with low molecular weight diols, the products prepared do not exhibit rubbery characteristics.

It is an object of the present invention to provide products which exhibit rubber-like properties and from which can be produced molded rubber-like articles which do not become brittle at low temperatures. A further object is to produce materials with outstanding abrasion properties and which are extremely tough and durable, yet which exhibit pronounced flexibility and elasticity, and which are capable of being formed into films, sheets, rods, tubing, and all types of molded articles.

It has been found that new and valuable elastomeric products, having the characteristics described in the objects set forth above, are obtained by reactions involving a polyalkylene ether glycol having a molecular weight of at least 750, an organic diisocyanate and a chain-extending compound containing active hydrogen atoms. This compound may be water or hydrogen sulfide, or may be an organic compound containing active hydrogen atoms attached to two different atoms in the molecule.

The term "polyalkylene ether glycol" as used throughout the specification and claims refers to a polyalkylene ether containing terminal hydroxy groups. These compounds are ordinarily derived from the polymerization of cyclic ethers such as alkylene oxides or dioxolane or from the condensation of glycols. They are sometimes known as polyalkylene glycols, polyalkylene oxide glycols, polyglycols or polyoxyalkylene diols. They may be represented by the formula $HO(RO)_nH$, in which R stands for an alkylene radical and $n$ is an integer greater than 1. In the polyethers useful in this invention, $n$ is sufficiently large than the polyalkylene ether glycol has a molecular weight of at least 750. Not all the alkylene radicals present need be the same. Polyglycols formed by the copolymerization of a mixture of different alkylene oxides or glycols may be used, or the polyglycol may be derived from a cyclic ether such as dioxolane, which results in a product having the formula $HO(CH_2OC_2H_4O)_nH$. Examples of compounds which contain diverse alkylene radicals and which are useful in the preparation of elastomers are those polyethers described in United States Patent No. 2,492,955 to Ballard et al. which have molecular weights in the desired range. The alkylene radicals may be straight-chain or may have a branched chain as in the compound known as polypropylene ether glycol, which has the formula

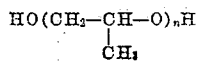

The polyalkylene ether glycols are either viscous liquids or waxy solids. Those useful in the process of this invention have average molecular weights which are at least 750 and may be as high as 10,000. The molecular weights referred to here and elsewhere throughout the specification and claims are calculated from the hydroxyl numbers of the polyglycols and therefore represent number average values. Polyalkylene ether glycols having molecular weights of 750 to 3500 are preferred. Polytetramethylene ether glycol, also known as polybutylene ether glycol, is the preferred member of this class of compound. Polyethylene ether glycol, polypropylene ether glycol, 1,2-polydimethylethylene ether glycol and polydecamethylene ether glycol are other typical representatives of the class.

Any of a wide variety of organic diisocyanates may be employed in the reaction, including aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred. In general they react more rapidly with the polyalkylene ether glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-4-methylphenyl) urea, which are the subject of U.S. Patent 2,757,185, may be used.

The chain extending agent which is used in the preparation of the new elastomers of this invention is a compound containing a plurality of active hydrogen atoms capable of reacting with isocyanates, no more than two atoms in the molecule having active hydrogen attached thereto. Water is the cheapest and in many cases the most desirable chain extending agent. Hydrogen sulfide is another inorganic compound useful for this purpose. There may also be employed organic compounds containing two and only two atoms in the molecule to which are attached active hydrogen atoms. The term "active hydrogen atoms" refers to hydrogens which, because of their position in the molecule, display activity according to the Zerewitinoff test as described by Kohler in J. Am. Chem. Soc., 49, 3181 (1927). In the chain extenders useful in this invention, the active hydrogen atoms are attached to oxygen, nitrogen or sulfur. The groups containing the active hydrogen will ordinarily be —OH, —SH, —NH—, —NH$_2$, —COOH, —CONH$_2$, —CONHR where R represents an organic radical, —SO$_2$OH, —SO$_2$NH$_2$, or —CSNH$_2$. The chain extending compound may be aliphatic, aromatic or cycloaliphatic or of mixed type. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylenediamino, propylenediamine, 4-aminobenzamide, sulfanilamide, aminopropionic acid, 1,4-cyclohexanedisulfonamide, 1,3 - propanedisulfonamide, 4 - hydroxybenzoic acid, p-aminophenol, ethylenediamine, succinic acid, succinamide, 1,4-butanedisulfonamide, 2,4-tolylenediamine, bis(4-aminophenyl)methane, beta-hydroxypropionic acid and 1,2-ethanedisulfonic acid. Compounds containing at least one amino group are the preferred organic chain extending agents.

The organic chain extenders have certain advantages which will sometimes make it desirable to use them instead of water. They are generally much more soluble in the polyalkylene ether glycol/diisocyanate polymer than is water and their vapor pressures are in most cases much lower. Certain of the chain extending agents are considerably more reactive with isocyanates than others and the speed of reaction may be to some extent controlled by a suitable choice of extending agent. The amines are particularly reactive agents. When water, a carboxylic acid or a sulfonic acid is used as the chain extender, carbon dioxide is evolved during the reaction. This must be removed from the reaction product unless a porous product is desired. With the other common organic chain extenders, no gas is evolved.

The elastomeric products of this invention may be prepared according to several different procedures. In one typical method, the diisocyanate is mixed with the polyalkylene ether glycol in suitable mixing equipment at a temperature which is preferably from 70° to 120° C., but which may range from room temperature, e.g., 20° C., to as high as 150° C. If the molar ratio of diisocyanate to polyalkylene ether glycol is close to unity or when the molecular weight of the polyalkylene ether glycol is especially high, the reaction mass may become quite viscous and heavy-duty mixing equipment may be required. After one-half to three hours mixing or whenever there is no further change in the viscosity of the reaction mass, the desired amount of the chain extending agent is added and mixing is continued. When the mass forms tough, rubbery clumps or crumbs or begins to pull away from the mixer, it may be removed from the mixer and worked on a rubber mill to form a smooth band.

The product at this stage is a substantially linear polymeric product in the form of a somewhat elastic, homogeneous solid capable of being cured to form a vulcanized elastomer. If substantially all the isocyanate groups have been used up by reaction with the polyglycol or the chain extending agent, the product will be stable and will not cure until additional di- or triisocyanate or other curing agent is added. If free isocyanate groups are present, the product is curable without the addition of any extra curing agent. This condition may exist even though a stoichiometric excess of the chain extending agent is present, since reaction with some of the extending agents proceeds relatively slowly. The product containing free isocyanate groups may be molded and cured directly or may be stabilized against premature curing by the addition of small amounts of a nitrogen base containing at least one hydrogen atom attached to nitrogen, as described in U.S. Patent 2,917,486. When stabilized in this manner, the reaction product may be stored for extended periods before curing.

Instead of first reacting the polyalkylene ether glycol with the diisocyanate to form what may be referred to as a pre-polymer and subsequently reacting this with the chain extending agent as described above, all of the ingredients may be added simultaneously or the diisocyanate may be added to a mixture of the glycol and the chain extender. Alternatively, the chain extender may first be reacted with diisocyanate and this reaction product be mixed with either the polyalkylene ether glycol or a reaction product of the glycol with additional diisocyanate. Depending on the particular reactants and their molar proportions, the polymeric products obtained by these procedures may differ somewhat in their properties from the products obtainable by the two-step process first described. Instead of using only a single diisocyanate, polyalkylene ether glycol, or chain extender, mixtures of two or more of each type of compound may be employed.

In an alternative procedure, the reaction may be carried out in a solvent. A preferred type of solvent is one in which the final elastomeric reaction product is insoluble. Suitable solvents of this type include aliphatic hydrocarbons such as heptane and octane. When the reaction is carried out in such a solvent, the polyalkylene ether glycol may first be dissolved and any water that is present may be azeotropically distilled off. The organic diisocyanate is then added and after completion of the reaction between these components, the chain extender is added. After continued stirring and heating, the elastomeric product separates out, usually in the form of small particles. It may be separated from the solvent by filtration or decantation and may then be worked on a heated rubber mill to remove any solvent which still remains. It is then in condition for further compounding or curing. This procedure is further described and claimed in U.S. Patent 2,830,037.

It has been found that a limited number of solvents of the type containing oxygen or nitrogen, including dimethylformamide, tetrahydrofuran and dioxane, have a definite solvent action on the uncured elastomeric reaction product of this invention. Elastomers may be prepared by reacting together a polyalkylene ether glycol, an organic diisocyanate and a chain extending agent entirely in solution in such a solvent. The resulting uncured reaction product may be recovered by evaporation of the solvent.

The reaction between the polyalkylene ether glycol and the organic diisocyanate may be controlled so as to avoid undesired gel formation by the presence of small amounts of an acid-reacting compound such as an acid chloride, bromide or iodide or an inorganic acid, as disclosed and claimed in copending application Serial No. 288,531 of Langerak et al., filed May 17, 1952, now U.S. Patent 2,692,873. An acid-reacting compound, as for example benzenesulfonyl chloride, may be added to accomplish this control or small amounts of acid-reacting materials may already be present in the other reactants. Thus, when tetrahydrofuran is polymerized in the presence of acidic catalysts, the polytetramethylene ether glycol remaining after hydrolysis and separation may contain small amounts of acid constituents which will have a definite controlling influence on the reaction.

The reaction may be accelerated by the presence of the acid salt of an organic tertiary nitrogen or phosphorus base, such as pyridine, as described in copending application Serial No. 288,532 of Langerak, filed May 17, 1952, now U.S. Patent 2,692,874. The presence of such a reaction catalyst is particularly useful during the chain extension step.

The elastomers prepared according to the procedures described above are capable of being cured to form highly useful vulcanized elastomers. Whenever the uncured reaction product is free of or contains only a small number of free isocyanate groups, either because of the proportions of reactants used or because a stabilizer was employed, it is necessary to add an additional amount of an organic polyisocyanate, usually a diisocyanate, to accomplish curing. Any of the diisocyanates previously described as useful in the initial reaction with the polyalkylene ether glycol are suitable for use as curing agents. Diisocyanate dimers and such compounds as di(3-isocyanato-4-methylphenyl) urea are particularly convenient curing agents. This latter compound is disclosed and claimed in U.S. Patent 2,757,185, and its use as a curing agent in U.S. Patent 2,818,404. Curing is often facilitated by incorporating a small amount of magnesium oxide with the uncured elastomer. In practice, the addition of from 1 to 20% of a diisocyanate, based on the weight of the uncured reaction product, is adequate for the curing of stabilized products. The diisocyanate may conveniently be mixed with the uncured product on a rubber mill and the mixture may then be cured by placing it in a mold and heating under pressure. Only enough pressure is required to force the elastomer to assume the shape of the mold. The temperatures and pressures used in ordinary rubber processing are satisfactory for use in curing the elastomers of this invention. Pressures of 50 to 1000 pounds per square inch or higher and temperatures of from 80 to 175° C. are ordinarily satisfactory. At the higher temperatures, shorter curing times must be used to avoid degrading the product. Most of the polymers of this invention may conveniently be cured or vulcanized by heating at 130–135° C. for about 30 minutes. It is also possible to produce curing at room temperature and atmospheric pressure, particularly when the uncured product is in the form of thin sheets, merely by allowing it to stand for a period of several days or longer.

When the reaction has been carried out in a solvent in which the reaction product remains soluble, films or coatings may be formed by pouring or otherwise applying the solution to form a thin film and allowing the solvent to evaporate. If the product has not been reacted with a chain extending agent, chain extension can take place by reaction of the polymer with moisture in the air. Curing can take place simultaneously, provided that free isocyanate groups are present. Similarly if the polymer has previously been reacted with the chain extending agent and still contains free isocyanate groups, curing of the film can take place upon standing at either room or elevated temperature. If no free isocyanate groups are present, a curing agent, ordinarily an organic diisocyanate, is added to the solvent system before forming the film. Curable films may be prepared, for example, from an uncured reaction product of polytetramethylene ether glycol, 2,4-tolylene diisocyanate and water by rolling or ball milling the uncured product with from 4 to 8% by weight of the dimer of 2,4-tolylene diisocyanate in methylethyl ketone, tetrahydrofuran, a 50/50 mixture of methylethyl ketone and a tetrahydrofuran, or a 50/50 mixture of tetrahydrofuran and benzene, the polymer concentration being from 5 to 10%.

In the preparation of these elastomers, the molar ratio of diisocyanate to polyalkylene ether glycol is preferably between 1.1:1 and 12:1. Polymers formed from mixtures in which the ratio of diisocyanate to polyether is less than 1.1:1 are difficult to cure. The use of more than 12 molar parts of diisocyanate for each part of the polyether is unnecessarily wasteful of the isocyanate. Ordinarily the molar ratio will not exceed 5:1. The most useful range of molar ratios is from about 1.2:1 to 3:1.

The amount of the chain extending compound used may vary considerably. The chain extending agent serves not only to link together the polyether-diisocyanate polymer units and so to lengthen the polymer chain, but also to provide active hydrogen atoms which serve as sites for cross-linking. It is therefore highly desirable that some chain extender be employed. On the other hand, if the reaction product is permitted to contain too high a proportion of the chain extending agent, the desirable properties conferred by the polyalkylene ether glycol are less pronounced. It is generally advantageous to have the molar ratio of polyether glycol to chain extending agent between 9:1 and 1:9, although in any case, enough of the polyalkylene ether glycol should be incorporated into the reaction product that the polyether residues resulting from it comprise at least 35% of the total weight of the product. In the preferred products of this invention the polyether residues resulting from the polyalkylene ether glycol comprise from 60 to 95% of the weight of the product.

When the polyalkylene ether glycol and organic diisocyanate react with one another, an initial reaction takes place with the formation of a linear intermediate polymer containing urethane linkages. This reaction may be represented as follows:

OCN—B—NCO+HO—G—OH→
 ... —B—NH—CO—O—G—O—CO—NH—B—
       NH—CO—O—G—O—CO—NH—B— ...

where B is a bivalent organic radical and O—G—O is the residue obtained by removing the terminal hydrogen atoms from a polyalkylene ether glycol having a molecular weight of at least 750. If the diisocyanate is present in molar excess, this intermediate polymer will have terminal isocyanate groups and may be represented by the formula OCN—B(NH—CO—O—G—O—CO—NH—B)$_m$—NCO in which B and O—G—O have the significance stated above, and $m$ is an integer greater than zero. These intermediate or prepolymers may then react through their free isocyanate groups with chain extending agents containing active hydrogn. The reactions of isocyanates with the active hydrogen-containing groups present in the various typical chain extending agents are described in the literature as proceeding as follows:

2-NCO+H$_2$O→—NH—CO—NH—+CO$_2$↑
2-NCO+H$_2$S→—NH—CO—NH—+COS↑
—NCO+HO—R—→—NH—CO—O—R—
—NCO+H$_2$N—R—→—NH—CO—NH—R—
—NCO+HS—R—→—NH—CO—S—R—
—NCO+HOOC—R—→—NH—CO—R—+CO$_2$↑
—NCO+H$_2$N—CO—R—
    →—NH—CO—NH—CO—R—
—NCO+H$_2$N—CS—R—
    →—NH—CO—NH—CS—R—
—NCO+H$_2$N—SO$_2$—R—
    →—NH—CO—NH—SO$_2$—R—
—NCO+HOSO$_4$—R—→—NH—SO$_2$—R—+CO$_2$↑

It is apparent from the foregoing table that when water and hydrogen sulfide are used as chain extenders, there is a carbonyl linking group between the imino groups, which imino groups are attached to the isocyanate residues. When the other typical chain extenders are used, an acyl radical is attached to the imino group. Thus, when these other typical chain extenders react with two free isocyanate groups of the isocyanate-terminated prepolymer units and, if present, molecules of the original diisocyanate, a diacyl radical is the connecting radical between the imino groups which are attached to the isocyanate residues. These diacyl radicals are non-polymeric, are free from any intralinear unsaturation other than carbon to carbon unsaturation and are hereinafter referred to by the letter "Q."

After reaction of the chain extending agents with the isocyanate-terminated prepolymer and any excess diisocyanate which may be present, the resulting polymeric product is a polyalkylene ether-polyurethane polymer being comprised essentially of structural units having the formula:

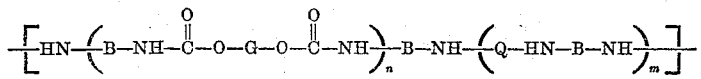

wherein O—G—O is a bivalent radical resulting from removal of the terminal hydrogen atoms from a polyalkylene ether glycol; B is a bivalent organic radical; Q is a radical selected from the group consisting of a carbonyl radical and a non-polymeric diacyl radical; $n$ is an integer greater than zero; and $m$ is an integer including zero; each of the said structural units being connected to the next by a radical Q, having the significance defined above.

When water or hydrogen sulfide is the chain-extending agent, the reaction taking place between each molecule of the extending agent and isocyanate groups results in the formation of a urea linkage, whether the isocyanate groups are attached to a pre-polymer unit or to a molecule of the original diisocyanate. The chain extended product will then comprise a plurality of

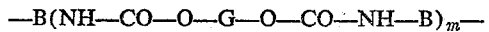

pre-polymer units joined to one another or to —B— radicals, in case some of the original diisocyanate was available for reaction, by urea linkages, —NH—CO—NH—. The relative proportions of the prepolymer units and of the —B— radicals will depend on the molar ratios of reactants and the order in which the several ingredients are added. This linear chain extended polymer has a polymer chain consisting predominantly of a plurality of bivalent organic radicals, each separated from the next by an intervening carbonyl group. The bivalent organic radicals in the case of the water or the hydrogen sulfide extended product consist of (a) diimino radicals

derived from the organic diisocyanate and (b) polyether radicals, —O—G—O—, which are derived from the polyalkylene ether glycol.

When an organic chain extending agent other than a sulfonic acid is reacted with the pre-polymer, either alone or in the presence of excess diisocyanate, the chain extending bridge which is formed will have the formula —NH—CO—E—CO—NH—, where —E— is the residue of the chain extending agent. In this case, the resulting polymeric product also has a polymer chain consisting predominantly of a plurality of bivalent organic radicals separated by intervening carbonyl groups, in which the bivalent radicals are (a) diimino radicals, —NH—B—NH—, derived from the diisocyanate, (b) polyether radicals, —O—G—O—, derived from the polyalkylene ether glycol, and (c) bivalent radicals, —E—, derived from the organic chain extending agent. The radicals represented by —E— may terminate in an oxygen or sulfur atom, an imino or other non-hydrocarbon radical, or if derived from a carboxylic acid may terminate simply in a methylene group.

When an organic sulfonic acid is used as the chain extending agent, the pre-polymer units and residues of the diisocyanates will be linked by the group

—NH—SO$_2$—E—SO$_2$—NH— in which —E— is the residue of the chain extending agent remaining after removal of the sulfonic acid groups. As in the cases described above, the chain extended polymer will have a polymer chain consisting predominantly of a plurality of bivalent organic radicals derived from the diisocyanate, the polyalkylene ether glycol, and the chain extender. Instead of all of these organic bivalent radicals being linked to one another by carbonyl groups, however, in this case some of the units will be connected by sulfonyl groups.

Both the polyalkylene ether glycol and the chain extending agent ordinarily enter the polymer chain by reacting with isocyanate groups. Accordingly, each of the intervening carbonyl or sulfonyl linking groups in the reaction product is normally attached directly to at least one imino group, derived from an isocyanate group, regardless of the nature of the chain extending agent. In many cases, an intervening carbonyl group will be attached to two imino radicals, i.e., be part of a urea linkage, as for example when the chain extending agent terminates in amino groups or when the chain extender is water or hydrogen sulfide. In many cases, the portion of the polymer chain separating one polyalkylene ether glycol residue from the next will contain a plurality of these urea linkages. In every linear polymeric product of this invention derived from a diisocyanate, at least 50% of the bivalent organic radicals in the polymer chain will be diimino radicals. When the chain extender is water, hydrogen sulfide or a diamine, which includes the preferred chain extenders, all of the bivalent organic radicals in the chain joined to one another by carbonyl groups will be either diimino radicals or the polyether residues from the polyalkylene ether glycol. In the preferred product, from 55 to 75% of the bivalent organic radicals will be 2,4-tolylene diimino radicals and the others will be residues obtained by removing the terminal hydrogen atoms from polytetramethylene ether glycols having molecular weights between 750 and 3500, these radicals being separated from one another by intervening carbonyl groups.

It is apparent that if the polyalkylene ether glycol, the diisocyanate, and the chain extending agent are reacted in suitable proportions simultaneously, or if suitable amounts of the chain extending agent are first reacted with diisocyanate under suitable conditions before adding to the polyalkylene ether glycol or to the prepolymer, the resulting polymeric product will in each case contain a plurality of bivalent organic radicals derived from the same sources and linked to one another by means of the same intervening groups as in the product which is obtainable by first reacting the polyalkylene ether glycol with the diisocyanate and thereafter reacting the resulting pre-polymer with a chain extender, as described above.

When the substantially linear uncured reaction product is cured, it is believed that cross-linking of the polymer chains takes place. The cured or vulcanized elastomer is no longer workable on a rubber mill to form a continuous band. Cross-linking ordinarily takes place by the reaction of a compound containing a plurality of isocyanate groups with active hydrogen atoms present in different polymer chains. The hydrogen atoms of urea groups are particularly reactive and when such groups are available, cross-linking ordinarily takes place at these sites. The reaction of the isocyanate with the urea group produces a biuret group by the following reaction:

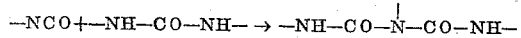

The uncured reaction product which has been chain extended with water or with hydrogen sulfide contains a plurality of urea linkages (—NH—CO—NH—) connected either to pre-polymer units,

or to —B— radicals derived from the diisocyanate. The vulcanized product obtained by cross-linking this uncured product by means of a diisocyanate, either added as a curing agent or already present in the polymer, will contain a plurality of both the bivalent urea and the trivalent biuret groups, all the linkages of these groups being attached either to

or to —B—, since all of the —NCO groups entering into the cross-linking reactions as well as all of the urea linkages are already attached to these same groups.

The cured elastomer obtained from a product in which an organic diamine is the chain extending agent will also contain a plurality of urea and biuret groups, all the linkages of which are attached either to

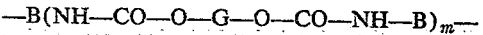

or to —B—. In this case some of the bivalent organic radicals —B— are derived from the diamine while the rest are derived from the diisocyanate. In this formulation it is to be understood that not all of the B radicals need be the same.

Instead of preparing the elastomers of this invention by reacting the polyalkylene ether glycol with a diisocyanate and a chain extending agent, they may alternatively be made by first reacting together the polyalkylene ether glycol with phosgene to form a bis-chloroformate ester, and then reacting this product with a diamine and additional phosgene to produce the desired elastomer.

The new elastomers of this invention and their preparation are illustrated by the following examples:

Example 1

A Werner-Pfleiderer mixer is charged with 1731 parts by weight of a polytetramethylene ether glycol having a molecular weight of 3024 as determined by its hydroxyl number and an acid number of 0.6, 3.29 parts of water and 229 parts of 2,4-tolylene diisocyanate. The charge is heated and mixed for two hours at 80° C. and then allowed to cool during a period of 30 minutes to 70° C. There are then added 17.2 parts of water and mixing is continued for 30 minutes at 70°, 30 minutes at 70 to 85° C., for 15 minutes at 85 to 103° C., and for 10 minutes at 103–130° C. with the compression cover in place.

A portion of the product is sheeted out on a cool rubber mill and 0.8% by weight of piperidine is incorporated as a stabilizer. The intrinsic viscosity of the stabilized product is 0.8. Portions of this product are compounded on a rubber mill with 4 parts of di(3-isocyanato-4-methylphenyl)urea for each 100 parts of product. The compounded stock is cured under pressure for 15 minutes at 134° C. The resulting vulcanized product shows a Bureau of Standards abrasion of 561 and a Yerzley resilience of 84. When tested under water at 25° C. it has a tensile strength greater than 5100 lbs. per sq. in., an elongation at the break greater than 540%, and a modulus at 300% elongation of 940 lbs. per sq. in.

Example 2

1550 parts by weight of polytetramethylene ether glycol having an average molecular weight of 2580 are placed in an agitated vessel and heated to 80° C. The vessel is evacuated and held under vacuum for 16 hours at 80° C. to remove any water which is present. Then 52.2 parts of 2,4-tolylene diisocyanate are added and the temperature is raised to 100° C. Agitation is continued for 30 minutes at this temperature. The mixture is then heated to 120° C. and agitated for an additional hour. The mass is then cooled to 50° C. and transferred to a Werner-Pfleiderer mixer which is at 30° C. Mixing is started and 4.32 parts by weight of water are added and mixing is continued for 45 minutes at 30° C. There are then added 83.52 parts of 2,4-tolylene diisocyanate. Mixing is continued according to the following schedule: 30 minutes at 30° C., 45 minutes at 50° C., 30 minutes at 100° C. and 120 minutes at 128° C. The mass is then cooled and removed from the mixer and milled to a smooth sheet on a rubber mill. The product is stable to storage and after four months is still millable.

One hundred (100) parts of the polymer are milled on a rubber mill with 10 parts of the dimer of 2,4-tolylene diisocyanate until thoroughly mixed. A portion is then put in a mold and cured in a press for 60 minutes at 134 C. The resulting rubbery polymer when tested at 25° C. in water has a tensile strength at the break of 3980 lbs. per sq. in., a modulus at 300% elongation of 480 lbs. per sq. in. and an elongation at the break of 640%.

Example 3

1060 parts of a polytetramethylene ether glycol having an average molecular weight of 2900, a hydroxyl number of 39.5 and containing 0.078% water is milled together with 95.4 parts of 2,4-tolylene diisocyanate in a Werner-Pfleiderer mixer at 100° C. for 2.5 hours. There are then added 44.6 parts of finely powdered m-tolylenediamine and mixing is continued for an additional 30 minutes. The product is in the form of lumps of a soft, somewhat tacky, rubbery dough.

One hundred (100) parts of this product are milled on a cold rubber mill with 8 parts of the dimer of 2,4-tolylene diisocyanate to a smooth band. A portion is then put in a mold to form rings and cured in a press at 134° C. for 30 minutes. The rubbery rings when tested at 25° C. under water show a tensile strength at the break of greater than 4830 lbs. per sq. in., a modulus at 300% elongation of 1130 lbs. per sq. in. and an elongation at the break of 610%.

Example 4

A mixture of 1 molar part of a polytetramethylene ether glycol having an average molecular weight of 2670, an acid number of 1.35, and containing 0.033% water with 2.3 molar parts of 2,4-tolylene diisocyanate is heated in a Werner-Pfleiderer mixer at 100° C. for about two hours under an atmosphere of nitrogen. There is then added 0.965 molar part of ethylene glycol and the mass is heated and mixed for one hour at 100° C. and for an additional two hours at 120° C. The mass is removed from the mixer and sheeted out on a rubber mill. To stabilize the product against premature curing, 0.5% of piperidine, based on the weight of polymer is added during the milling.

One hundred (100) parts by weight of the stabilized polymer are sheeted out on a cold rubber mill and 8 parts of the dimer of 2,4-tolylene diisocyanate are thoroughly milled in. A portion of the compounded polymer is placed in a mold and cured in a press at 105° C. for two hours. The cured elastomer, when tested at 25° C. in water, has a tensile strength of 4340 lbs. per sq. in., a modulus at 300% elongation of 625 lbs. per sq. in., and an elongation at the break of 620%.

Example 5

Sixty-seven (67) parts of polybutylene ether glycol having a molecular weight of 2300 are melted in a Werner-Pfleiderer mixer maintained at 100° C. There are added 13.05 parts of 2,4-tolylene diisocyanate and the mixture is heated at 100° C. for 1 hour, after which 0.588 part of pyridine is added. After several minutes milling, 1.7 parts of water are added. In 10 minutes the reaction mass has increased in viscosity. The temperature is then raised to 110° C. and the milling is continued for another 10 minute period. The product becomes tougher and finally separates from the mixer blades in the form of shredded chunks. The polymer is milled for a short time on a rubber mill, giving sheets of rough but well-knit translucent polymer. Press curing for 1 hour at 135° C. yields smooth, transparent rubbery slabs having a tensile strength of 1800 lbs. per sq. in.

Example 6

Into a Werner-Pfleiderer mixer preheated to 100° C. are placed 99 parts of n-butylene ether glycol of an average molecular weight of 10,000. After the glycol is melted, 26.1 parts of 2,4-tolylene diisocyanate and 0.38 part of phosphorus trichloride are added. The mass is then milled 1 hour at 100° C. A clear yellow viscous liquid results. A total of 1.2 parts of pyridine and 3.0 parts of water is then added with continued milling in three equal increments at intervals of 20 minutes. The temperature is held at 100° C. during this time. At the end of 30 minutes after the last addition the product is in the form of white doughy chunks. The mass is then worked on a rubber mill at 30° C. to a smooth homogeneous white band.

A portion is cured in a mold at 140° C. under 2800 lbs. per sq. in. pressure for 1 hour. An opaque, cream-colored slab is obtained. It is tough and rubbery and has a tensile strength at the break of 4800 lbs. per sq. in.

Example 7

Two hundred eighty (280) parts of a polytetramethylene ether glycol having an average molecular weight of 2800 are placed in a Werner-Pfleiderer mixer and melted at about 70 to 80° C. There are then added 1.045 parts of water and the mass is milled at 70 to 100° C. for ten minutes, after which 26.2 parts of 2,6-tolylene diisocyanate are added. Mixing is continued for ten minutes at 100° C. and then for 60 minutes at 130° C. After cooling, the rubbery mass is removed and milled on a rubber mill until smooth. The polymer is still readily millable after 11 weeks storage. This product is identified as polymer A.

Other stable polymers are prepared by similar procedures using p-phenylene diisocyanate, 4,4'-methylene-bis-(cyclohexyl isocyanate), and m-phenylene diisocyanate, respectively, in place of the 2,6-tolylene diisocyanate. These products are identified as polymers B, C and D, respectively. The molar proportions of ingredients are essentially the same in each case.

Portions of each of these polymers are cured by incorporating therewith the dimer of 2,4-tolylene diisocyanate on a rubber mill, and heating in a mold at 134° C. for 30 minutes. The resulting vulcanized elastomers show the following properties when tested in water at 25° C.:

| Product | A | B | C | D |
|---|---|---|---|---|
| Percent dimer used for cure | 5 | 5 | 5 | 8 |
| Tensile strength, lbs./sq. in | 4,830 | 4,840 | 2,900 | 4,600 |
| Modulus at 300% elongation | 1,360 | 650 | 994 | 517 |
| Elongation at break, percent | 470 | 640 | 450 | 500 |

Example 8

One molar part of a polytetramethylene ether glycol having an average molecular weight of 2800 is mixed with 0.57 molar part of water for 15 minutes in a W-P mixer at 64° C. There are then added 1.5 molar parts of decamethylene diisocyanate. Mixing is continued at 64° for one hour, at 100° C. for one hour, and finally at 130° C. for four hours. The resulting stable product is still millable 14 days after it is prepared. One hundred (100) parts by weight of this polymer is milled on a rubber mill with 5 parts of the dimer of 2,4-tolylene diisocyanate until thoroughly mixed. A portion is then put into a ring mold and cured in a press at 100° C. for one hour. The product is identified as polymer A.

An elastomer is prepared using the same molar proportions of ingredients, but substituting hexamethylene diisocyanate for the decamethylene diisocyanate. The procedure followed is substantially identical except that the highest temperature employed during the mixing step is 100° C. The uncured product remains millable for as long as one month. A portion of this product, identified as polymer B-1, is treated with 5% by weight of the dimer of 2,4-tolylene diisocyanate, while another portion, identified as polymer B-2, is milled with 5% by weight of di(3-isocyanato-4-methylphenyl) urea. Each sample is then cured in a mold at 134° C. for 30 minutes. The properties of the cured products are as follows:

| Product | A | B-1 | B-2 |
|---|---|---|---|
| Tensile strength, lbs./sq. in | 1,590 | 2,130 | 2,500 |
| Modulus at 300% elongation | 455 | 370 | 170 |
| Elongation at the break, percent | 600 | 500 | 600 |

Example 9

Seventy-five (75) parts of polytetramethylene ether glycol having an average molecular weight of 2860, an acid number of 0.6, and a water content of 0.20% and 16.08 parts of 1,5-tetralin diisocyanate (90%) are mixed and heated together in a Werner-Pfleiderer mixer at 100° C. for 2 hours. The temperature is then dropped to 50° C. for 30 minutes and 0.387 part of water is added. The reaction mass is mixed at 50° C. for thirty minutes, then at 100° C. for 30 minutes and then at 125° C. for 5.25 hours. The mass is cooled to 50° C., 1 part piperidine is added, and milling is continued in order to form a stabilized product.

One hundred (100) parts of the above polymer are banded out to a smooth band on a rubber mill and then 5 parts of the dimer of 2,4-tolylene diisocyanate are added and a homogeneous mass is formed. A portion is put into a ring mold and cured by heating in a press for 30 minutes at 134° C. The rings are tested in water at 25° C., with the following results:

Tensile strength at the break _____lbs./sq. in.__ 940
Modulus at 300% elongation _____lbs./sq. in.__ 480
Elongation at the break _____percent__ 470

Example 10

One molar part of a polytetramethylene ether glycol having an average molecular weight of 2150 and containing 0.06% water is mixed with 2.3 molar parts of 2,4-tolylene diisocyanate in a W-P mixer at 115° C. for about two hours under an atmosphere of nitrogen. There are then added 1.42 molar parts of succinic acid and heating and mixing are continued until the polymer forms a crumbly, rubbery mass or pulls away from the mill. The polymer is removed from the mixer and milled on a rubber mill to form a smooth band. There is added on the rubber mill 0.75% by weight of piperidine to act as a stabilizer. To a portion is added 8% by weight of the dimer of 2,4-tolylene diisocyanate as the curing agent. The compounded polymer is cured by putting it in a mold having a slab form and heating under pressure to about 134° C. for 60 minutes.

Other polymers are prepared using the same procedure but substituting various other chain extending agents for the succinic acid and varying the time of milling and the curing agents as indicated in the following table.

| Chain extender | Molar parts of extender | Mixing time after extender addition, hours | Cure | |
|---|---|---|---|---|
| | | | Agent | Pts./100 pts. polymer |
| A. Succinic acid | 1.42 | 3.5 | dimer [3] | [4] 8 |
| B. Adipic acid | 1.24 | [2] 4.0 | dimer / MgO | 8 / 5 |
| C. Terephthalic acid | 1.2 | [2] 35 | dimer / MgO | 8 / 5 |
| D. Dithiooxamide | 1.0 | 3.0 | dimer | 8 |
| E. 4-aminobenzamide | 1.28 | [2] 1.5 | dimer / MgO | 8 / 5 |
| F. 1,3-propane disulfonamide [1] | 1.4 | 20 | dimer / MgO | 8 / 5 |
| G. 1,2-ethanedithiol | 1.0 | 10 | dimer | 8 |
| H. Sulfanilamide [1] | 1.22 | [2] 12 | dimer / MgO | 8 / 5 |
| I. 4-(beta-hydroxyethoxy) phenol | 1.3 | 18 | dimer | 8 |
| J. Beta-hydromuconic acid | 1.16 | 11.5 | dimer / MgO | 8 / 5 |

[1] 1.4% by weight pyridine added during the mixing step, as a reaction catalyst.
[2] No piperidine added.
[3] Dimer of 2,4-tolylene diisocyanate.
[4] Cured 60 minutes at 134° C.; all others cured 30 minutes.

These products display the following properties when tested at 25° C.:

| | Tensile strength, lbs./sq. in. | Modulus at 300% elongation, lbs./sq. in. | Elongation at break, percent |
|---|---|---|---|
| A | 1,263 | 632 | 520 |
| B | 2,400 | 1,160 | 500 |
| C | 1,400 | | 250 |
| D | 1,420 | 842 | 440 |
| E | 3,430 | 2,170 | 420 |
| F | 1,730 | | 280 |
| G | 1,740 | 631 | 560 |
| H | 1,950 | 914 | 550 |
| I | 1,240 | 848 | 400 |
| J | 1,520 | 1,160 | 360 |

Example 11

One molar part of a polytetramethylene glycol having an average molecular weight of 2150 and containing 0.06% water is put into a vessel with about 130% of its weight of n-octane. The mixture is heated to the boil and about one-sixth of the liquid, comprising an azeotrope of n-octane and water, is distilled off at about 126° C. to dry the polyether glycol. The solution is cooled to 100–115° C. and 2.3 molar parts of 2,4-tolylene diisocyanate are added. The solution is heated at the reflux (126° C.) for two hours while stirring and is then cooled to 85–100° C. and 1.2 molar parts of thiodipropionic acid are added. The reaction mass is stirred and heated at reflux until it becomes so viscous that further stirring is impossible. There is added during this period 1.4% by weight of pyridine based on the weight of polymer. The mass is allowed to cool to room temperature over a period of several hours. At this stage, the polymer is insoluble in the n-octane. Excess solvent is decanted and the polymer is milled on a rubber mill at 70–90° C. to drive off residual solvent. Curing is accomplished by mixing the polymer with 8% of its weight of the dimer of 2,4-tolylene diisocyanate and 5% MgO, followed by pressing in a mold for 30 minutes at 134° C.

Other polymers are prepared by the same procedure, but using in place of thiodipropionic acid the various chain extending agents shown in the following table.

| Chain extender | Molar parts of extender | Time of mixing after extender addition, hours |
| --- | --- | --- |
| A. Thiodipropionic acid | 1.2 | 3 |
| B. Adipamide [1] | 1.3 | 0.5 |
| C. 1,3-benzenedisulfonamide | 1.23 | 20 |
| D. Glycolamide [1] | 1.3 | 3 |

[1] No pyridine added.

The physical properties of the resulting vulcanized elastomers, when tested at 25° C., are as follows:

| | Tensile strength, lbs./sq. in. | Modulus at 300% elongation, lbs./sq. in. | Elongation at break, percent |
| --- | --- | --- | --- |
| A | 1,280 | 1,220 | 350 |
| B | 2,430 | 1,500 | 440 |
| C | 1,920 |  | 260 |
| D | 1,300 | 700 | 550 |

Example 12

One molar part of polytetramethylene ether glycol having an average molecular weight of 2150 and containing 0.06% water is put into a Werner-Pfleiderer mixer and heated to 115° C. There are then added 2.3 molar parts of 2,4-tolylene diisocyanate and the mass is milled for 2 hours. There are then added 1.23 molar parts of 1,2-ethanedisulfonic acid and milling is continued for 3 hours. The polymer is then removed and sheeted out on a rubber mill.

One hundred (100) parts of the polymer are compounded on a rubber mill with 8 parts of the dimer of 2,4-tolylene diisocyanate and 5 parts of MgO. A portion is put in a mold and cured in a press at 134° C. for 30 minutes. The elastomer is tested at 25° C. in water with the following results:

Tensile strength at the break _____ lbs./sq. in__ 3470
Modulus at 300% elongation _____ lbs./sq. in__ 1160
Elongation at the break _____ percent__ 650

Example 13

A solution of 125 parts of polytetramethylene ether glycol having an average molecular weight of 2890 in 65 parts of toluene is added slowly with stirring to a solution of 28.5 parts of phosgene dissolved in 60 parts of toluene at 4–8° C. After all the solution is added stirring is continued at 4–8° C. for 1.5 hours. The conversion of the polytetramethylene ether glycol to polytetramethylene ether bis-chloroformate is essentially complete as judged by analysis of an isolated portion (the analysis of hydrolyzable chlorine is approximately 98% of theory).

A portion of the bis-chloroformate mixture containing 18.75 parts polytetramethylene ether bis-chloroformate, 2.18 parts phosgene, 0.45 part hydrogen chloride, and 18.0 parts toluene is added slowly to a rapidly stirred solution of 3.04 parts m-tolylenediamine, 11.0 parts sodium acetate ($CH_3COONa \cdot 3H_2O$) and 0.38 part of a sodium alkyl sulfate in which the alkyl is predominantly dodecyl and tetradecyl, dissolved in 220.0 parts water, while the temperature is maintained at 10° C. Stirring at this temperature is continued for 10 minutes after the addition is complete and then for 10 minutes at 25–30° C. A soft polymer separates. It is removed, washed on a corrugated rubber mill and then dried on a smooth rubber mill at 105–110° C.

Ten (10) parts of this polymer are thoroughly mixed with 0.3 part of litharge and 0.8 part of N,N'-bis-(3-isocyanato-4-methylphenyl) urea and then cured in a mold under pressure at 110° C. for 2 hours. The rubbery products show the following properties:

Tensile strength at the break _____ lbs./sq. in__ 4030
Modulus at 300% elongation _____ lbs./sq. in__ 1385
Elongation at the break _____ percent__ 650

The elastomers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by a number of advantageous properties including excellent resistance to heat and cold, direct sunlight, oxygen and ozone, oil and other hydrocarbon solvents. They display unusually outstanding resistance to mechanical abrasion and to deterioration caused by flexing, stretching and the like. Having a low brittle point, they are particularly useful for fabricating articles to be used at low temperatures, such as −20° C. In fact, at temperatures as low as −70° C. these products do not become brittle. The elastomers made with polytetramethylene glycol are especially insensitive to water, and display superior resilience and abrasion resistance and hence are preferred.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide, and plasticizers. Inorganic and organic coloring agents may be incorporated to give well defined colors, as the natural color of these elastomers is a pale yellow or light amber.

The compounding agents may be incorporated with the elastomer at the same time as additional diisocyanate is added prior to curing. Conventional rubber processing machinery such as rubber mills or Werner-Pfleiderer or Banbury mixers may be used. The resulting compounded stocks may be shaped and cured in conventional equipment used in the rubber industry.

The compounded uncured elastomers of this invention may be dissolved in or extended with solvents to permit their application as coatings. The action of solvents appears to be quite specific and varies from one elastomer to another. The uncured reaction product made from a polytetramethylene ether glycol, 2,4-tolylene diisocyanate and water will form a dispersed free flowing gel or solution in concentrations of 5 to 10% by weight in the tetrahydrofuran, methylethyl ketone, toluene, nitrobenzene, o-dichlorobenzene, tetrachloroethane, chloroform, thiophene, a 50/50 mixture of tetrahydrofuran and methylethyl ketone, a 50/50 mixture of tetrahydrofuran and benzene, pyridine, cyclohexanone, and the diethyl ether of ethylene glycol. Smooth films can be formed by evaporating the solvent from these dispersions.

The solubility of the products of this invention may be altered by the nature of the chain extending agent employed. The reaction product of polytetramethylene ether glycol and 2,4-tolylene diisocyanate which has been extended with adipic acid forms free flowing gels at 10 to 15% concentrations in methylethyl ketone, dimethylformamide, pyridine and the dimethyl ether or ethylene glycol. When 1,2-ethanedithiol is the chain extending agent instead of adipic acid, free flowing gels are formed at 20% concentration in methylethyl ketone, or in the dimethyl ether of ethylene glycol.

The solutions or dispersed gels prepared from the uncured elastomers of this invention may be used for forming supported or unsupported films, for coating fabrics or solid surfaces, and for forming adhesive bonds between a wide variety of plastics, elastomers, fabrics, metals, wood, leather, ceramics and the like.

This application is a continuation-in-part of my application Serial No. 297,990, filed July 9, 1952, now abandoned, which was itself a continuation-in-part of my application Serial No. 237,660, filed July 19, 1951, also now abandoned.

I claim:

1. The process of preparing a polytetramethylene ether-polyurethane polymer which comprises reacting a polytetramethylene ether glycol having a molecular weight of at least 750 with a molar excess of an organic diisocyanate, and further reacting the resulting polymer with a chain extending agent having a plurality of active hydrogen atoms capable of reacting with isocyanates, no more than two atoms in the molecule of the said chain extending agent having active hydrogen attached thereto, said chain extending agent being a member of the class consisting of water, hydrogen sulfide, and organic compounds containing two, and only two, functional groups in the molecule to which are attached active hydrogen atoms, said groups being connected to one another by a carbon chain, said chain being free from any intralinear unsaturation other than carbon to carbon unsaturation.

2. The process of claim 1 wherein the polytetramethylene ether glycol has a molecular weight of from 750 to 3500.

3. The process of claim 2 wherein the organic diisocyanate is an arylene diisocyanate.

4. The process of claim 3 wherein the chain extending agent is water.

5. The process of claim 3 wherein the chain extending agent is an organic diamine.

6. The process of preparing a polytetramethylene ether-polyurethane polymer which comprises reacting a polytetramethylene ether glycol having a molecular weight of from 750 to 3500 with a molar excess of 2,4-tolylene diisocyanate at a temperature of about 70° C. to 120° C., and further reacting the resulting polymer with water at a temperature of about 70° C. to 130° C.

7. A polytetramethylene ether-polyurethane polymer comprising essentially structural units having the formula

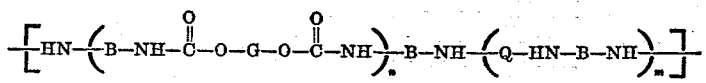

wherein O—G—O is a bivalent radical resulting from removal of the terminal hydrogen atoms from a polytetramethylene ether glycol having a molecular weight of at least 750; B is a bivalent organic radical, said radical being inert to isocyanate groups; Q is a radical selected from the group consisting of a carbonyl radical and a non-polymeric diacyl radical, said diacyl radical being free from any intralinear unsaturation other than carbon to carbon unsaturation; $n$ is an integer greater than zero; and $m$ is an integer including zero; each of the said structural units being connected to the next by a radical Q, having the significance defined above; the overall ratio of the number of B to O—G—O radicals in the polymer being between 1.1:1 and 12:1; and at least 60% of the total weight of the polymer being the bivalent radicals O—G—O.

8. The polymer of claim 7 wherein the bivalent radical, O—G—O, is obtained by removing the terminal hydrogen atoms from a polytetramethylene ether glycol having a molecular weight of from 750 to 3500.

9. The polymer of claim 8 wherein the bivalent organic radical, B, is an arylene radical.

10. The polymer of claim 8 wherein the bivalent organic radical, B, is a 2,4-tolylene radical.

11. The polymer of claim 10 wherein Q is a carbonyl group.

12. The polymer of claim 10 wherein Q is the non-polymeric diacyl radical

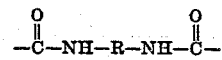

wherein R is a radical selected from the group consisting of alkylene and arylene radicals.

13. The polymer of claim 10 wherein Q is the non-polymeric diacyl radical

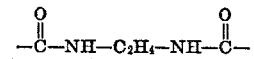

14. A cured elastomer obtained by reacting the polymer of claim 7 with an organic polyisocyanate.

15. A cured elastomer obtained by heating the polymer of claim 7 with an organic polyisocyanate at a temperature between about 80° C. and 175° C.

16. A linear polymer having the formula

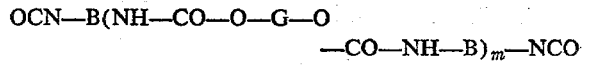

wherein O—G—O is a bivalent radical resulting from removal of the terminal hydrogen atoms from a polytetramethylene ether glycol having a molecular weight of at least 750, B is a bivalent organic radical, said radical being inert to isocyanate groups, and $m$ is an integer greater than zero.

17. The polymer of claim 16 in which the bivalent organic radical, B, is a 2,4-tolylene radical and the bivalent radical, O—G—O, is the residue resulting from removal of the terminal hydrogen atoms from a polytetramethylene ether glycol having a molecular weight between 750 and 3500.

18. The polymer of claim 7 in the form of a thin, pliable, unsupported film.

19. The process for preparing a linear polymer of claim 16 which comprises reacting a polytetramethylene ether glycol having a molecular weight of at least 750 with a molar excess of an organic diisocyanate.

20. The process of claim 16 wherein the polytetramethylene ether glycol has a molecular weight of from 750 to 3500.

21. The process of claim 20 wherein the organic diisocyanate is an arylene diisocyanate.

22. The process which comprises reacting under substantially anhydrous conditions a polytetramethylene ether glycol having a molecular weight greater than 1000 with a molar excess of an organic diisocyanate.

References Cited in the file of this patent

UNITED STATES PATENTS

| | | |
|---|---|---|
| 2,284,896 | Hanford et al. | June 2, 1942 |
| 2,531,392 | Breslow | Nov. 28, 1950 |
| 2,625,531 | Seeger | Jan. 13, 1953 |
| 2,625,532 | Seeger | Jan. 13, 1953 |
| 2,625,535 | Mastin et al. | Jan. 13, 1953 |

FOREIGN PATENTS

| | | |
|---|---|---|
| 892,107 | France | Jan. 3, 1944 |

UNITED STATES PATENT OFFICE
CERTIFICATE OF CORRECTION

Patent No. 2,929,800                      March 22, 1960

Frederick B. Hill, Jr.

It is hereby certified that error appears in the printed specification of the above numbered patent requiring correction and that the said Letters Patent should read as corrected below.

Column 1, line 52, for "than" read -- that --; column 5, line 37, for "and a" read -- and --; column 6, line 23, for "hydrogn" read -- hydrogen --; line 40, for "—$NCO+HOSO_4$—" read -- —$NCO+HOSO_2$— --; column 8, line 71, after "B" strike out the comma; column 11, first table, second column thereof, second item from the bottom, for "1.360" read -- 1,360 --; column 12, in the second table, second column thereof and opposite "D", for "1.420" read -- 1,420 --; column 15, line 2, strike out "the"; line 16, for "or" read -- of --; column 17, line 3, for the claim reference numeral "16" read -- 19 --.

Signed and sealed this 23rd day of August 1960.

(SEAL)
Attest:

KARL H. AXLINE                              ROBERT C. WATSON
Attesting Officer                      Commissioner of Patents